(12) United States Patent
Christman et al.

(10) Patent No.: US 8,782,996 B2
(45) Date of Patent: Jul. 22, 2014

(54) SYSTEMS AND METHODS FOR GROUND MOUNTED SOLAR ARRAY

(75) Inventors: Mike Christman, Fair Oaks, CA (US); Doug Moyles, Rocklin, CA (US)

(73) Assignees: Douglas Moyles, Rocklin, CA (US); Mike Christman, Fair Oaks, CA (US)

( * ) Notice: Subject to any disclaimer, the term of this patent is extended or adjusted under 35 U.S.C. 154(b) by 0 days.

(21) Appl. No.: 13/158,257

(22) Filed: Jun. 10, 2011

(65) Prior Publication Data
US 2012/0031456 A1     Feb. 9, 2012

Related U.S. Application Data

(60) Provisional application No. 61/353,964, filed on Jun. 11, 2010.

(51) Int. Cl.
*E04B 1/00* (2006.01)
*E04D 13/18* (2006.01)

(52) U.S. Cl.
USPC ........................................ 52/745.2; 52/173.3

(58) Field of Classification Search
USPC ................... 52/745.2, 745.19, 173.3
See application file for complete search history.

(56) References Cited

U.S. PATENT DOCUMENTS

| | | | | |
|---|---|---|---|---|
| 5,184,502 A * | 2/1993 | Adams et al. | | 73/31.01 |
| 5,505,788 A | 4/1996 | Dinwoodie | | |
| 6,559,371 B2 | 5/2003 | Shingleton et al. | | |
| 8,142,521 B2 * | 3/2012 | Wieting et al. | | 29/25.02 |
| 8,316,590 B2 * | 11/2012 | Cusson | | 52/173.3 |
| 2004/0128923 A1 | 7/2004 | Moulder et al. | | |
| 2008/0264467 A1 * | 10/2008 | Doko | | 136/245 |
| 2009/0038672 A1 * | 2/2009 | Conger | | 136/244 |
| 2009/0288691 A1 | 11/2009 | Hunt et al. | | |
| 2009/0316361 A1 | 12/2009 | Simon | | |

* cited by examiner

*Primary Examiner* — William Gilbert
*Assistant Examiner* — Kyle Walraed-Sullivan

(57) ABSTRACT

A modular oversized solar array with a support structure is provided that reduces land costs as a percentage relative to the production of electrical energy from solar installations. Components of the solar racking array may be manufactured using existing steel manufacturing facilities. The array may be configured to be temporarily held in place at a first position to allow workmen to perform panel installation work from ground level. The array may then be lifted, via a crane, to a second position (or a final tilted position) to allow for further assembly. The array may accommodate various topographical features or span over other structures, be lifted to higher than normal array heights or span over greater distances. The solar racking structure design has elevated minimum heights allowing for dual use of the underlying ground, as well as more efficient dismantling, decommissioning and relocation of the solar array.

5 Claims, 18 Drawing Sheets

US 8,782,996 B2

SYSTEMS AND METHODS FOR GROUND MOUNTED SOLAR ARRAY

CROSS-REFERENCE

This application claims the benefit of U.S. Provisional Application No. 61/353,964, filed Jun. 11, 2010, which application is incorporated herein by reference in its entirety.

BACKGROUND

Present systems for supporting solar panels tend to be labor intensive to manually construct and expensive. Given the size and weight of such systems, implementation of solar panel arrays in remote locations is difficult and expensive. When large quantities of solar array equipment are required, installation of a solar panel array in an environmentally sensitive area without significantly impacting the surrounding habitat becomes very difficult. Typically, such support systems do not allow for secondary uses of the land and cannot be easily dismantled, disassembled or moved to another location.

Thus, there are needs for improved systems and methods for ground mounted solar arrays.

SUMMARY

The invention provides for systems and methods for ground mounted solar arrays. Various aspects of the invention described herein may be applied to any of the particular applications set forth below. The invention may be applied as a standalone ground mounted solar array system or as a component of an integrated solution for solar arrays. The invention can be optionally integrated into existing solar array support methods and systems seamlessly. It shall be understood that different aspects of the invention can be appreciated individually, collectively or in combination with each other.

In one aspect, a method of assembling a photovoltaic array comprises: lifting a set of photovoltaic panels having supports in a first position, via a crane; moving the supports into a second position, wherein said supports contact an underlying surface and supports the set of photovoltaic panels above the underlying surface so that the photovoltaic panels do not contact the underlying surface; and disconnecting the photovoltaic panels supports from the crane.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

In the following detailed description, numerous specific details are set forth in order to provide a thorough understanding of the invention. However it will be understood by those of ordinary skill in the art that the invention may be practiced without these specific details. In other instances, well-known methods, procedures, components and circuits have not been described in detail so as not to obscure the invention. Various modifications to the described embodiments will be apparent to those with skill in the art, and the general principles defined herein may be applied to other embodiments. The invention is not intended to be limited to the particular embodiments shown and described.

In one aspect of embodiments of the invention, a modular oversized array provides improvements over existing solar panel racking or array structures in several ways. One benefit is that the oversized array allows for a higher power density per acre of land (or potential watts per square meter), allowing for increased power production per square meter/yard (or harvested watts per square meter) of a given measure of land.

For example, a 20 megawatt solar array system normally is comprised of hundreds of individual smaller arrays located on approximately 100-160 acres of land, with most of the land being reserved for shading setbacks between arrays, "drive aisles," and roads separating the individual smaller arrays, thus increasing the cost of construction, infrastructure, operations, maintenance, and ground maintenance, and decreasing the electrical efficiency via electrical resistance between arrays and increasing the total acreage needed for the array system. In a similar 20 megawatt solar array system utilizing oversized arrays as described in embodiments of the present invention, the total acreage required may be reduced to below 65 acres of land, in one embodiment, thus providing for a greater wattage density system on a given acre of land. Other systems in the prior art may have typical "drive aisle" rows between arrays of approximately the same dimension, with setback distances similar to agricultural rows. For example, there is typically one drive aisle (i.e. one row between array structures) of approximately 15-20 feet wide per normal array, thereby reducing the total available space for solar panel systems on a given measure of land. The module oversize array structure of embodiments of the present invention maximizes the total available productive square footage (or the percent of square footage allocated to product electricity) on a measure of land, and effectively reduces the number of drive aisles on the same. The net effect may be a reduction in the leased or owned land costs. The reduction in the required land used relative to the production of electrical energy from solar installations using the modular oversized array compared to typical smaller arrays can exceed 25%.

Figure 1:
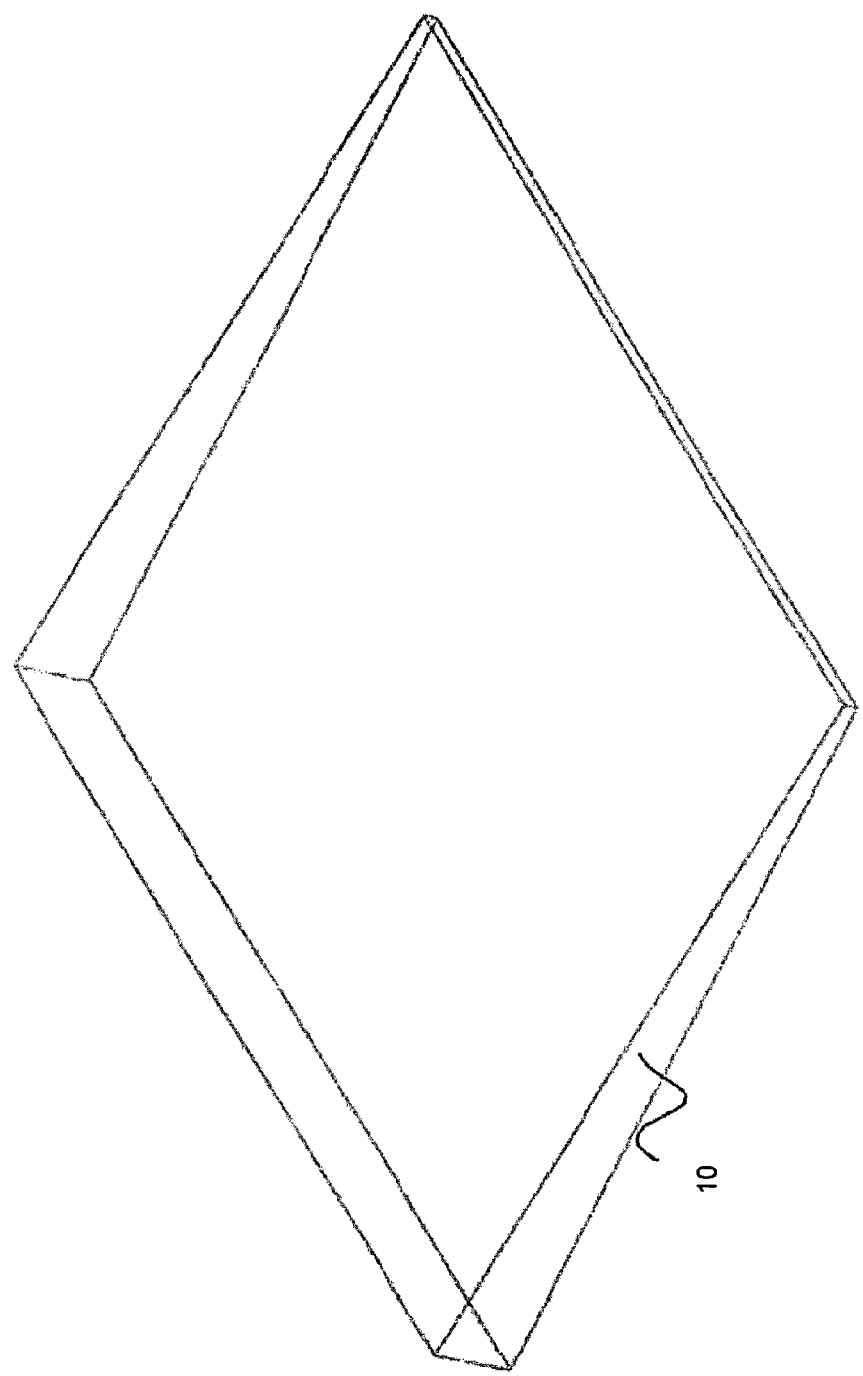
FIG. 1 illustrates an outline of a solar array support structure, in accordance with embodiments of the invention.
Figure 2:
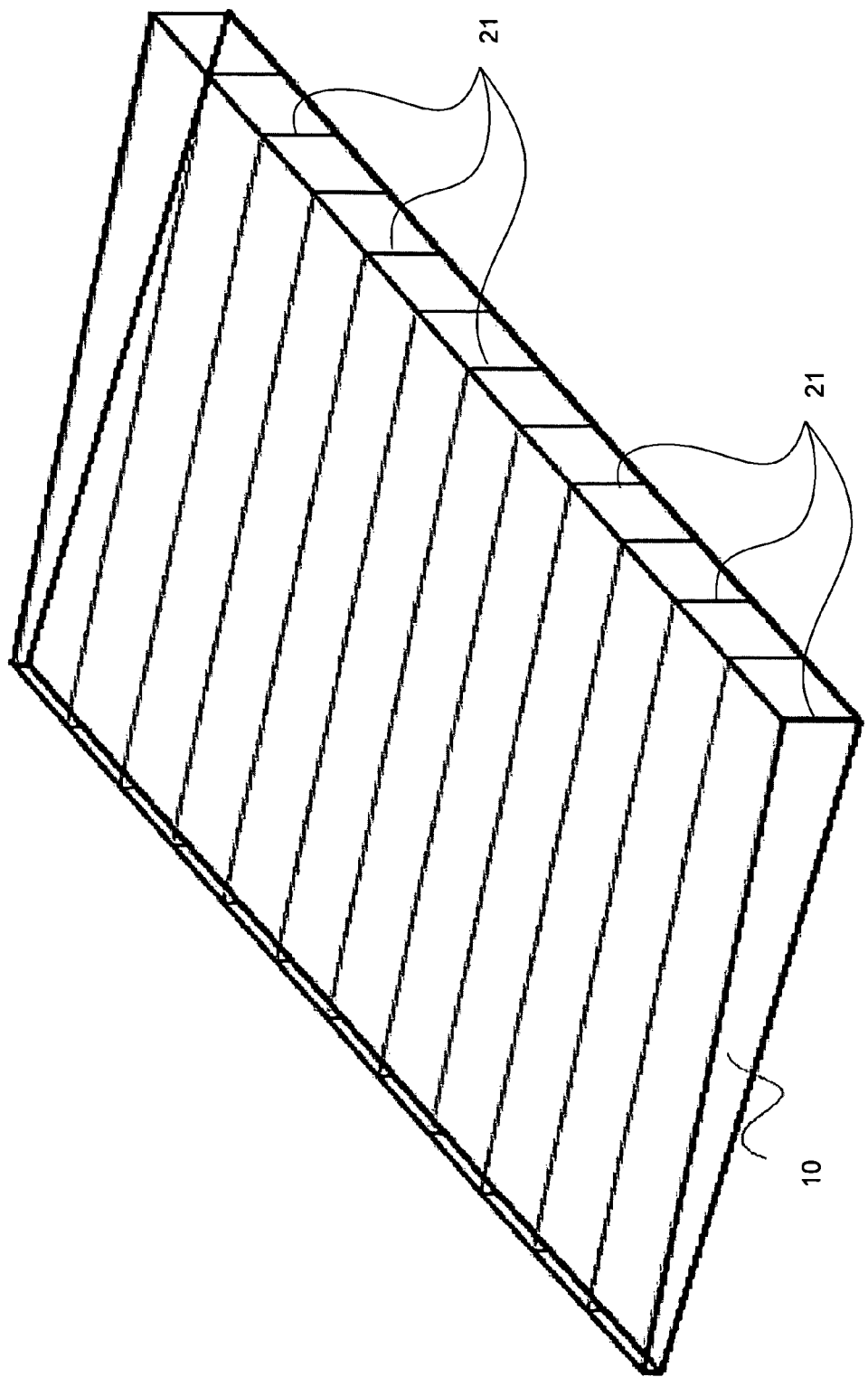
FIG. 2 illustrates the solar array support structure having steel fabricated columns, in accordance with embodiments of the invention.
Figure 3:
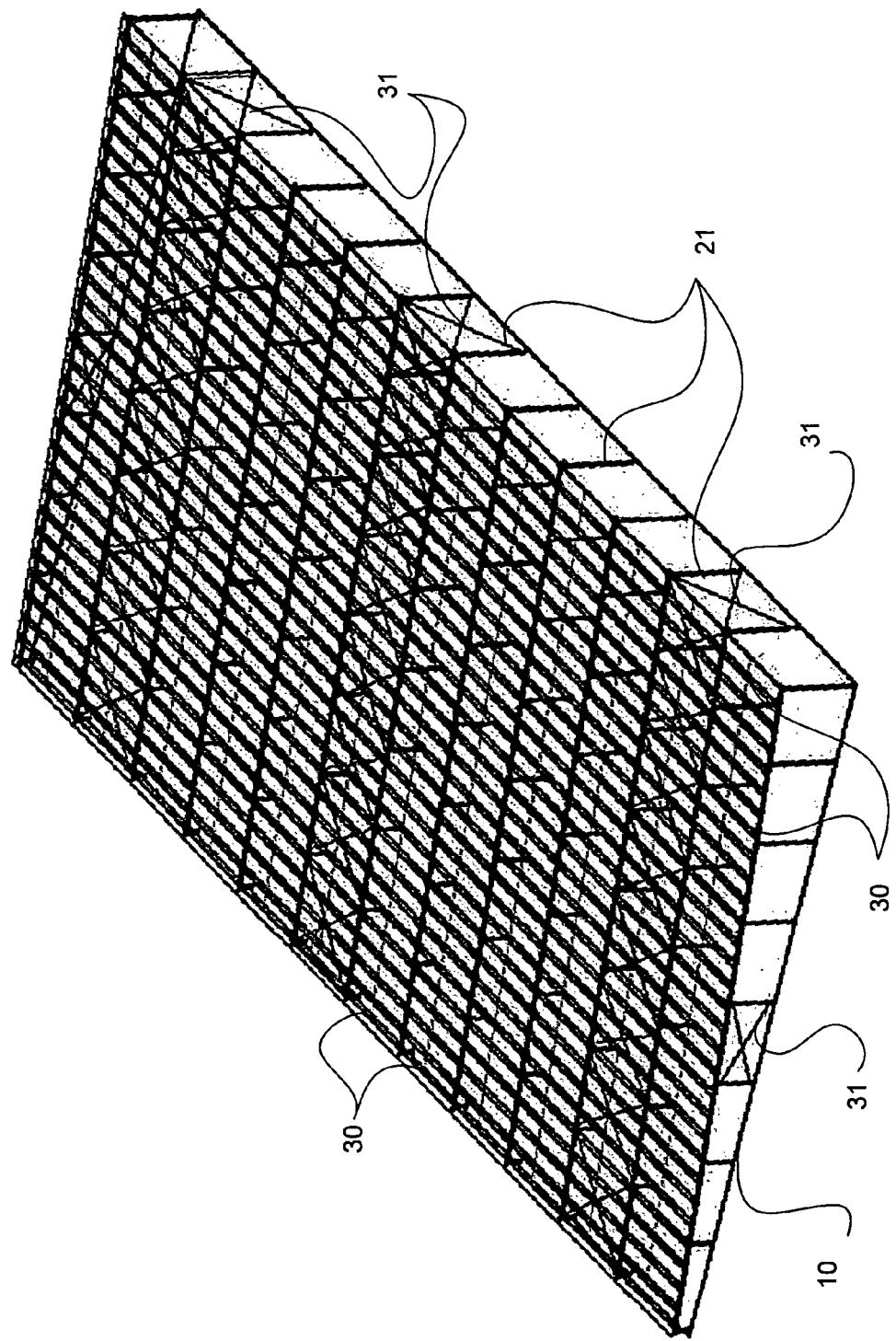
FIG. 3 illustrates the solar array support structure having steel fabricated tubing and support bars, in accordance with embodiments of the invention.

FIG. 1 illustrates an outline of a solar array support structure 10, in accordance with embodiments of the invention. FIG. 2 illustrates the solar array support structure 10 having steel fabricated columns 21, in accordance with embodiments of the invention. FIG. 3 illustrates the solar array support structure 10 having steel fabricated tubing and support bars, in accordance with embodiments of the invention. Each of the columns 21 may include multiple sections 30 spanning from a low end of the array support structure to a high end of the array support structure. Within each of the sections, there may be support beams. There may also be cross-braces 31 included for additional support. The solar array support (or solar panel racking or array structures or racking) may accommodate multiple solar array panels. The array may be configured to support various types of monocrystalline and polycrystalline photovoltaic modules, thin film photovoltaic modules, oversized solar panels, etc. In another embodiment, rather than creating electricity with photovoltaic panels, the support may also be used to support solar panels that collect solar thermal energy. The solar thermal collectors could be mounted on the solar array support, and thermal energy could be collected by use of a heat transfer medium pumped through flexible tubing.

The solar array support shown in FIGS. 1, 2 and 3 has a flat planar top surface, and may be installed over the ground surface or installed above water sources. The array may be first assembled on site at ground height or lifted to a first position, allowing workmen to perform the panel installation work from ground level or at a first position. In the first position, workmen may be able to conveniently perform assembly of the solar array—including building the support structure sections, mechanical work, or electrical connection work. The array may be configured to be cribbed (temporarily held in place) at the first position to allow workmen to perform the panel installation work from ground level versus working at varying heights. Further, because major components such as rails, struts, joists, beams, etc. may be pre-assembled in constituent parts at the manufacturing facility and shipped to site in component sections, there may be reduced delivery time of materials to the worksite.

Following assembly at a first position, the structure may be raised to a final position via crane or other lifting technique. In the second position, workmen may perform final assembly. No particular tilt or angle of elevation is required by the present invention; however, it is contemplated that, depending upon the latitude, time of year, and perhaps other factors, certain angles may be more effective in capturing incident solar irradiance. Thus, the solar array in its final position may be tilted.

The support may accommodate varying morphology of the ground surface. The support may be anchored into the ground, and the design of the array in accordance with embodiments of the invention may minimize the need for large scale earthwork to flatten the installation fields. Thus, the total carbon footprint of the installation (i.e. the amount of $CO_2$ emitted to construct a solar system) may be reduced. More specifically, the array design may allow for the spanning of natural and/or man-made ground features that would otherwise be avoided as an area of development or that would otherwise require large mechanical or manual efforts to move or remove ground features such as rocks, outcroppings, gullies, culverts, pipelines, etc. Various topographical features may be accommodated including mounds, hills, gullies, roads, depressions, pools, ponds, lakes, rivers, tanks, etc. The surface may be, for example, a generally flat area of ground, a picnic area in a park, a parking lot, a playground, or other ground surface. Or, the support may be positioned in an area that may not be suitable for other construction purposes or may be used to fill in unusable space within a commercial or industrial area. Further, due to the design's flexibility, the arrays can be adjusted to cover a greater surface area than traditional solar racking equipment may allow. The support may also be supported by a structure underneath it—either pre-existing or something built to support it. In its final position, the support structure may be secured (and/or anchored) within the ground, building or other type of surface.

The height of the structure may be sufficient to allow wildlife to pass below. For example, the elevated minimum heights may allow for the grazing of sheep, cattle and goats, the locating of chicken coops, etc. A number of potential environmental benefits from this type of structure may be identified, including that the structure provides a quiet and safe energy production array, the structure provides shade and/or shelter, and the structure can be installed without requiring a large amount of heavy machinery. The use of an array over eroding ground may encourage foliage growth in highly exposed locations and thus slow erosion.

Figure 4:
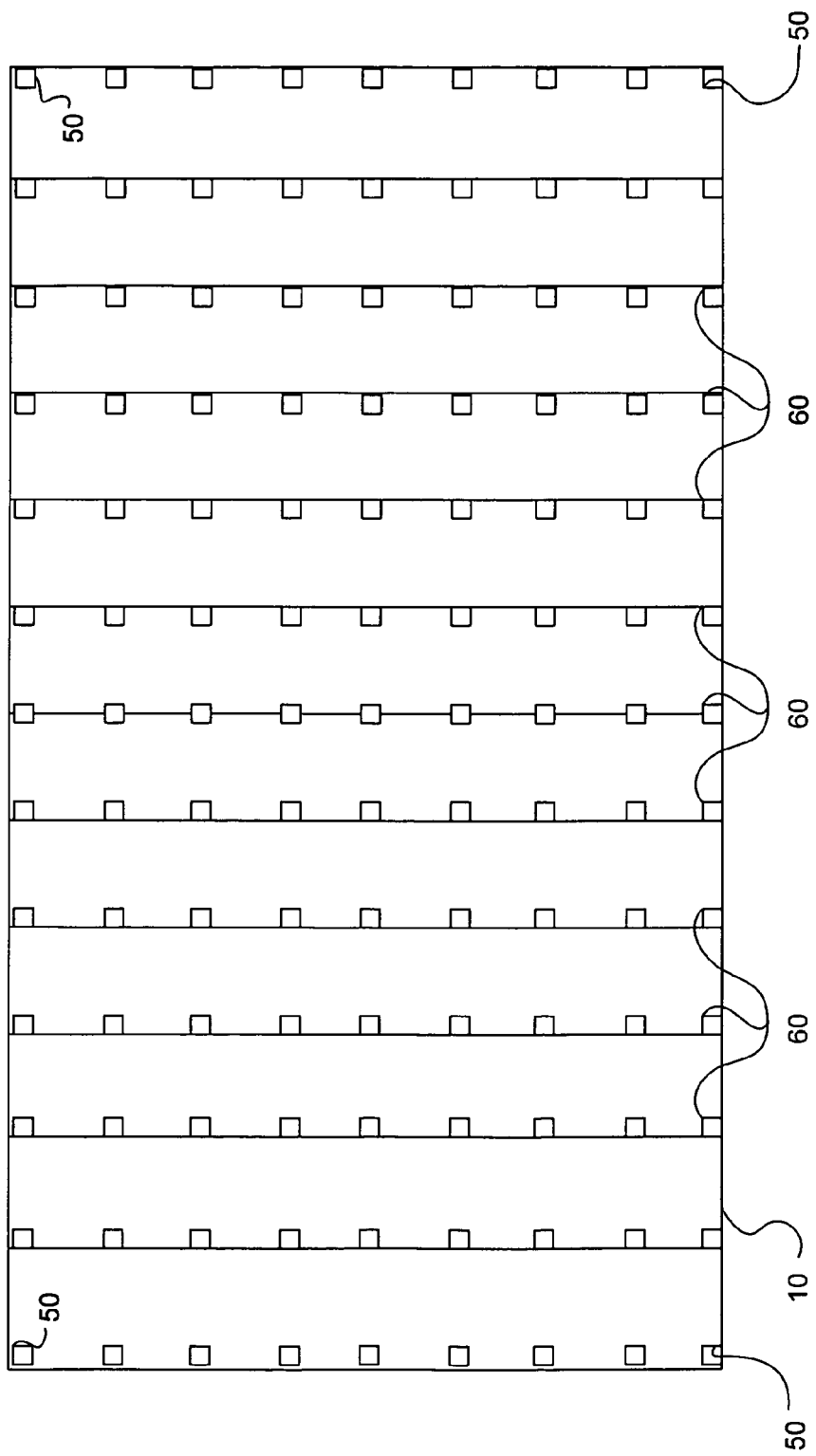
FIG. 4 illustrates a top view of an anchor rod plan of a solar array support structure having connections, in accordance with embodiments of the invention.

FIG. 4 illustrates a top view of an anchor rod plan of a solar array support structure having connections, in accordance with embodiments of the invention. The overall solar array may have a length or width of 20 feet or greater, 50 feet or greater, 100 feet or greater, 150 feet or greater, 200 feet or greater, 250 feet or greater, or 300 feet or greater. In FIG. 4, in one embodiment, the distance between the columns and rows may be as shown in the following table.

| Column/Row | Column/Row | Distance |
|---|---|---|
| A | B | 23 feet |
| B | C | 20 feet |
| C | D | 20 feet |
| D | E | 20 feet |
| E | F | 20 feet |
| F | G | 20 feet |
| G | J | 20 feet |
| J | K | 20 feet |
| 1 | 2 | 27 feet |
| 2 | 3 | 26 feet |
| 3 | 4 | 25 feet |
| 4 | 5 | 25 feet |
| 5 | 6 | 25 feet |
| 6 | 7 | 25 feet |
| 7 | 8 | 25 feet |
| 8 | 9 | 25 feet |
| 9 | 10 | 25 feet |
| 10 | 11 | 25 feet |
| 11 | 12 | 26 feet |
| 12 | 13 | 27 feet |

Figure 5:
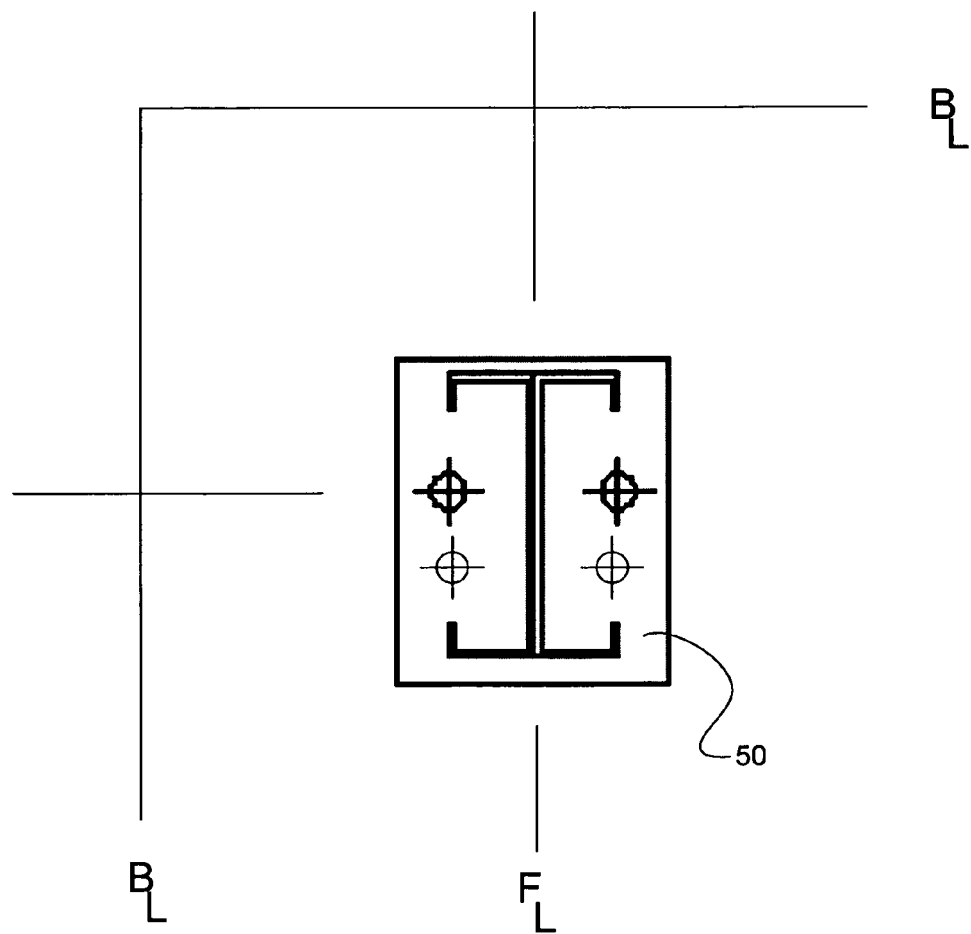
FIG. 5 illustrates a top view of a typical corner column base plate, in accordance with embodiments of the invention.

FIG. 5 illustrates a top view of a typical corner column base plate, in accordance with embodiments of the invention.

Figure 6:
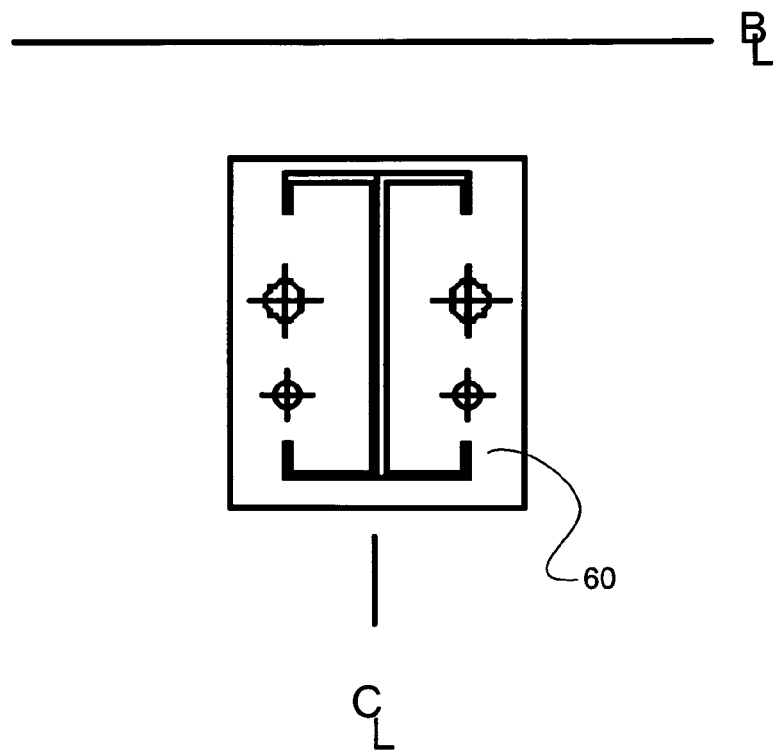
FIG. 6 illustrates a top view of a typical column base plate, in accordance with embodiments of the invention.

FIG. 6 illustrates a top view of a typical column base plate, in accordance with embodiments of the invention.

Figure 7:
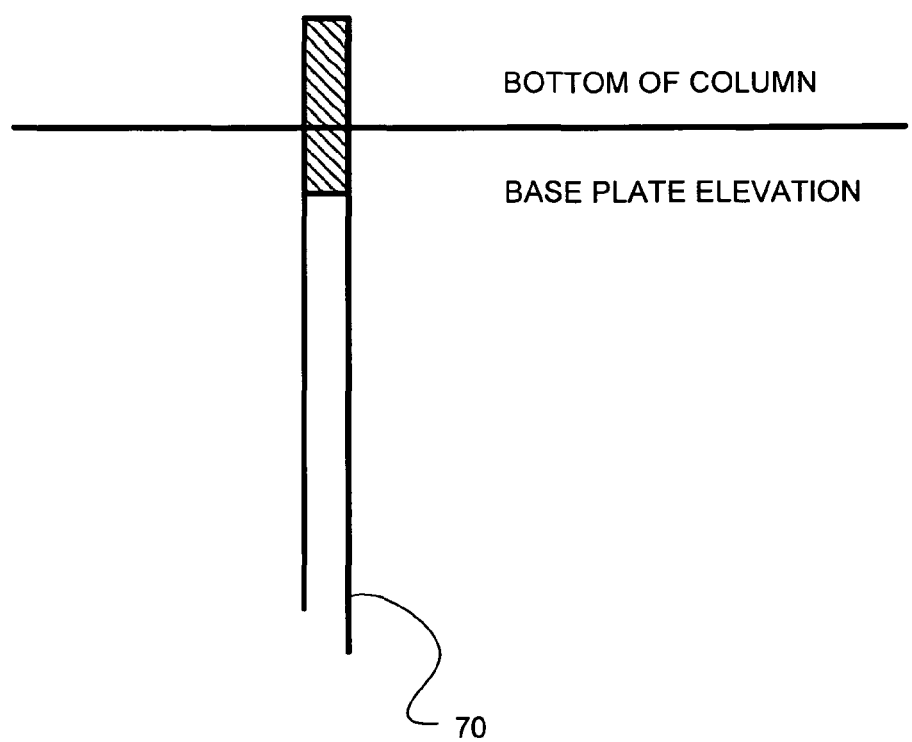
FIG. 7 illustrates an example of a side view of a typical anchor rod projection, in accordance with embodiments of the invention.

FIG. 7 illustrates an example of a side view of a typical anchor rod projection, in accordance with embodiments of the invention.

Any suitable material and/or structure may be used for the columns and rows of the solar array support structure including, for example, concrete, metal, a simple pole, or a more complicated trussed column. The primary and roof bracing or other parts of the support may be made of any material and design including, for example, metals, composites and/or polymeric fibers. In one embodiment, the primary material used in the anchor rods or other support components may be steel.

Because any suitable materials may be used, embodiments of the present invention may take advantage of a wide scale manufacturing base with the ability to be manufactured globally as an alternate to existing solar racking equipment. Various design and manufacturing methodologies can be implemented worldwide with little or no retooling of existing manufacturing facilities. As an alternative to using aluminum racking (i.e. a tube or box frame aluminum array support structure), it may also be possible to incorporate recycled steel materials, thereby further reducing the net carbon footprint of the system. By taking advantage of existing manufacturing capability and locations strategically placed nationally and internationally, the design of the array and portability may reduce freight and shipment time to project sites and thereby reduce emissions and reducing the net carbon footprint of the renewable energy construction industry.

In addition, fabrication turnaround from order time may be improved. The solar racking and manufacturing installation industry has not yet taken full advantage of the world's steel industrial manufacturing base in its efforts thus far. By incorporating steel structural components as described in embodiments of the present invention, the existing supply bottlenecks that have been encountered in solar projects due to limited supply of racking equipment may be reduced or eliminated. The steel industry may have the necessary capacity to support the worldwide effort to increase renewable energy production from solar installations. It may be a resource that can be used to accelerate the implementation of large utility scale installations of solar energy.

Figure 8:
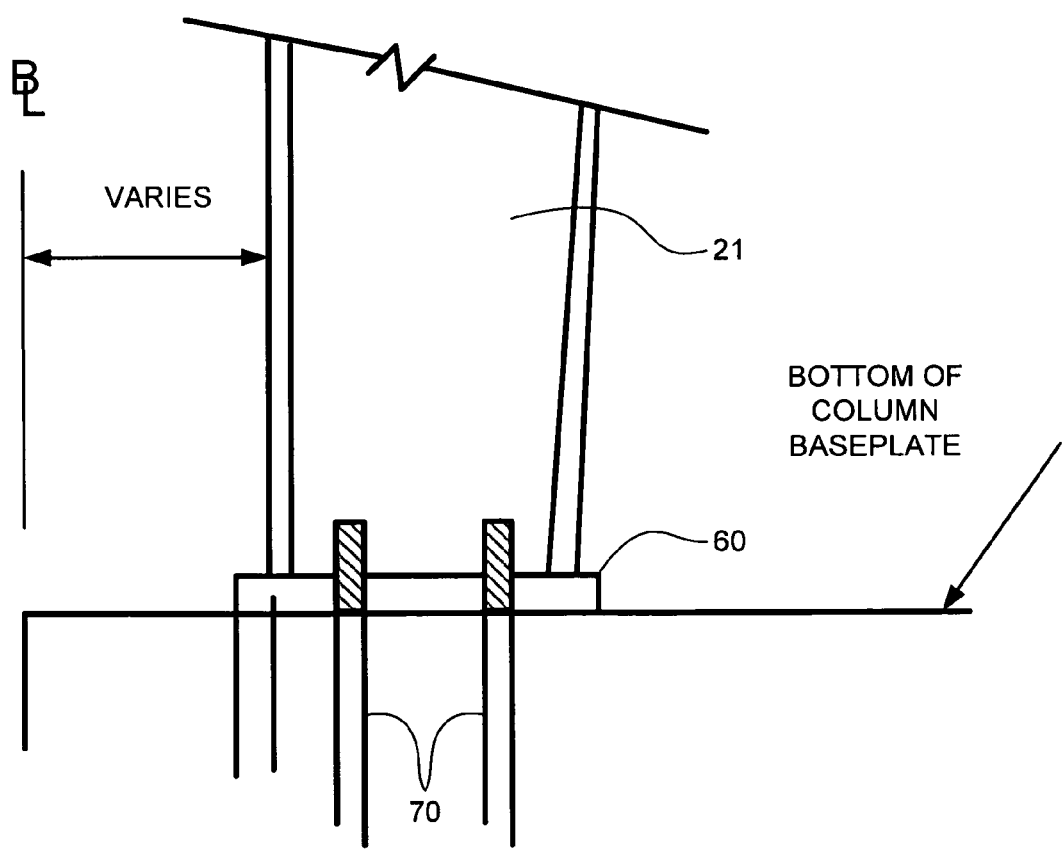
FIG. 8 illustrates an example of a side view of a typical anchor rod projection, and a typical column base plate, in accordance with embodiments of the invention.

FIG. 8 illustrates an example of a side view of a typical anchor rod projection, and a typical column base plate, in accordance with embodiments of the invention. The solar array support structure may be separated into sections to allow for the maximum number of configurations (by varying depth arrays). The overall solar array may have a length or width of 20 feet or greater, 50 feet or greater, 100 feet or greater, 150 feet or greater, 200 feet or greater, 250 feet or greater, or 300 feet or greater. In one embodiment, Column base plate spacing is varied from 20 to 23 feet between them.

Figure 9:
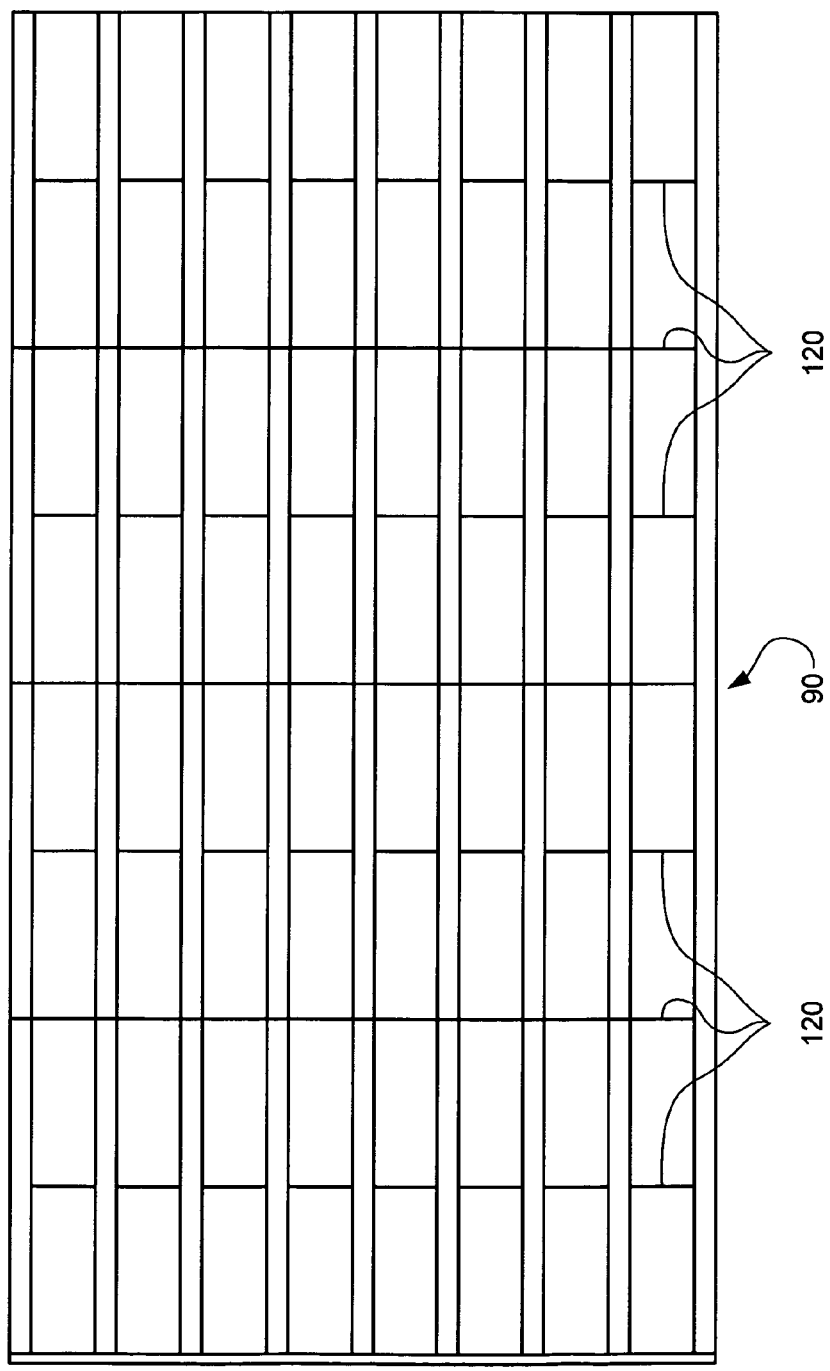
FIG. 9 illustrates a top view of a sectional roof of a solar array support structure having connections, in accordance with embodiments of the invention.

FIG. 9 illustrates a top view of a sectional roof of a solar array support structure having connections, in accordance with embodiments of the invention. The structure may have a low end and a high end.

Figure 10:
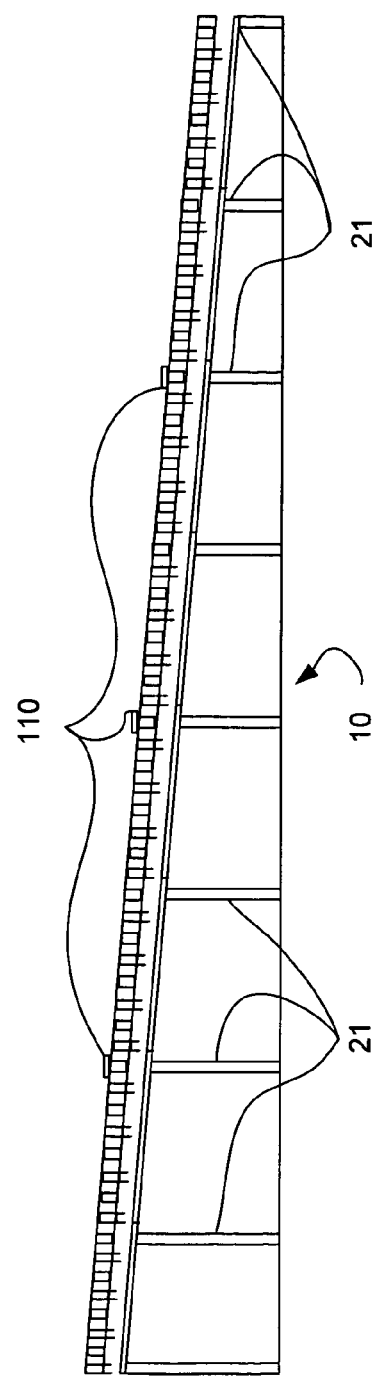
FIG. 10 illustrates an example of a side view of a solar array support structure, in accordance with embodiments of the invention.

FIG. 10 illustrates an example of a side view of a solar array support structure, in accordance with embodiments of the invention. As shown in FIG. 10, a solar panel may be supported by the solar array support structure and attached at an attachment location. A pipe may also be included in the solar racking structure design to take advantage of automated panel cleaning technologies currently available for utility scale solar installations. FIG. 10 also illustrates an example of a side view of a solar array support structure with gaps between sections, in accordance with embodiments of the invention. The gaps may allow for air movement, reducing the amount of wind resistance of the array. The gaps may also allow for relative movement of the support structure components. Thus, the gap may allow the components to move independently, rendering the overall array less rigid and more likely to withstand high winds. The gap may also prevent neighboring components from damaging one another in windy conditions. The gaps between sections may be modified to best match the particular purpose of installation, as well as provide the necessary support and airflow through the gaps in order to best handle wind and snow loading conditions. Further, it may be necessary to provide gaps due to the presence of interfering structures or natural obstacles, such as trees, lighting poles, etc. Safety requirements may also be accommodated by the gaps so that emergency vehicles with large heights are able to more easily access the areas between and under the arrays.

Figure 11:
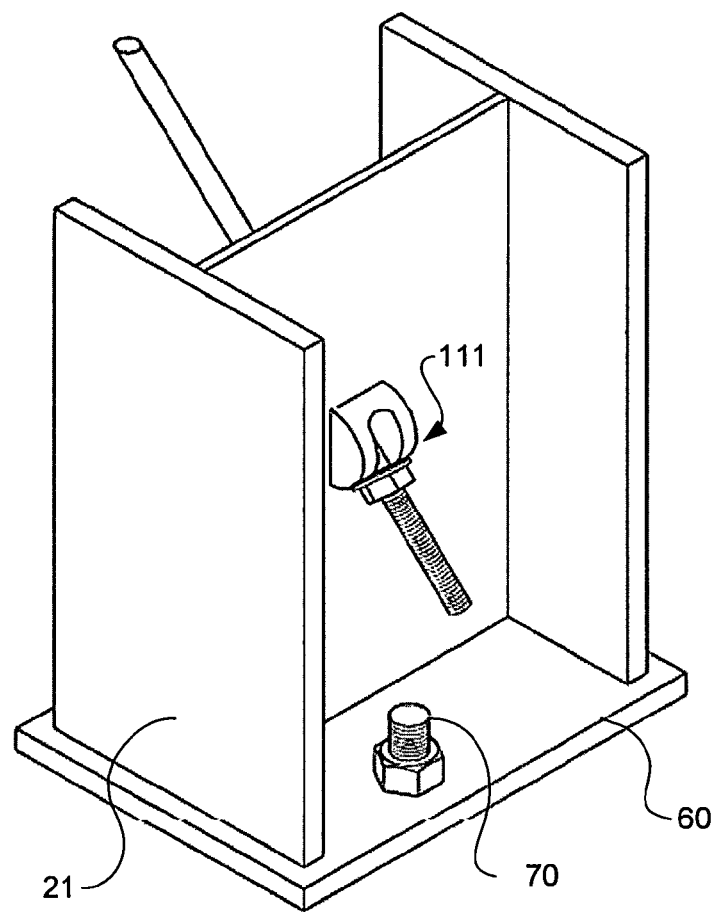
FIG. 11 illustrates a side view of a solar array support structure column rod brace connection above baseplate, in accordance with embodiments of the invention.

FIG. 11 illustrates a side view of a solar array support structure column rod brace connection above baseplate, in accordance with embodiments of the invention. The relative height of the columns may be variable and this made be made possible via sliding or other mechanisms. While FIG. 11 illustrates an embodiment where the support bars or columns are variable height, in other embodiments, all of the support bars or columns may be the same height.

The heights of the columns may help define the angles that the solar panel receives have with respect to the incident sunlight. In some embodiments, the columns or the solar panels may include a mechanism allowing for tilting or adjustment of the angle of the solar panels. To do so, for example, the length of the support beams may include a mechanism for changing the angle of the individual panels or entire sections. For example, as the season changes, the height of the sun in the sky may vary sufficiently to affect the efficiency of the solar panels, and so it may be desirable to vary the angle of the solar panels. Also, as the sun moves throughout the day, it may be desirable to change the angle of the sections to improve light reception.

The height may also be chosen to allow for a desired activity to occur beneath the array. For example, if a parking lot is beneath the array, the height may be sufficient to allow typical cars and light trucks to be parked underneath the array, or the height may be higher to allow commercial trucks to be parked beneath the structure. If a playground is beneath the array, the array may have a height chosen to allow installation of desired playground equipment.

Depending upon the location where the solar panel array is to be installed, it may be necessary to adjust the location of the support bars in order to take advantage of available ground spaced and to maximize the area to be covered by the solar panel array. For example, if the solar panel array is used to cover a parking lot, it may be necessary to adjust the location of the support bars based upon available spaces in the parking lot, in order to maximize the overall area covered by the array structure. Additionally, there may also be some aesthetic benefits achieved in arranging the support bars in various combinations of both vertical and angular extensions from the mounting surface.

Figure 12:
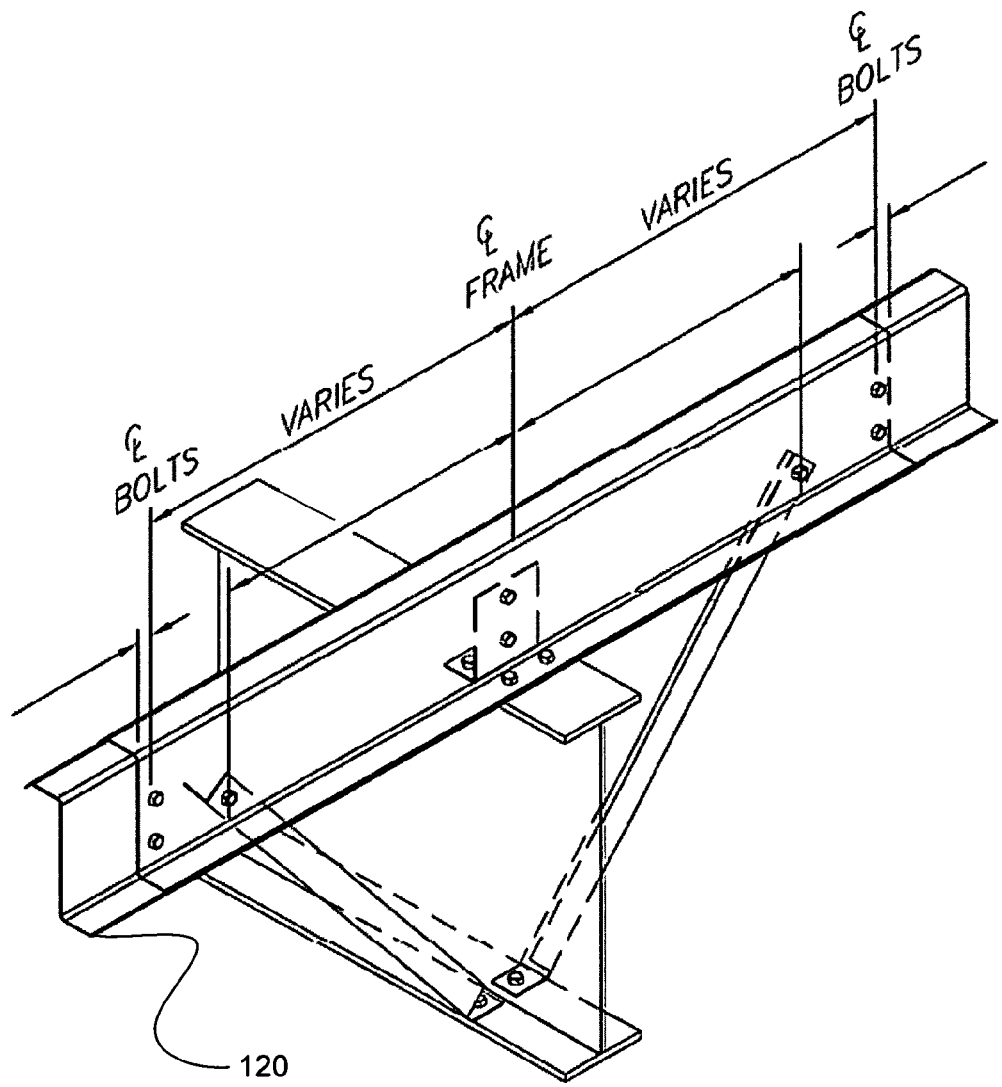
FIG. 12 illustrates a side view of a solar array support structure with various connections of purlin sections, in accordance with embodiments of the invention.

FIG. 12 illustrates a side view of a solar array support structure with various connections of purlin sections, in accordance with embodiments of the invention. As shown in FIG. 12, various lengths of purlins are joined above the support structure with bolts, however other means of fastening can also be used.

Figure 13:
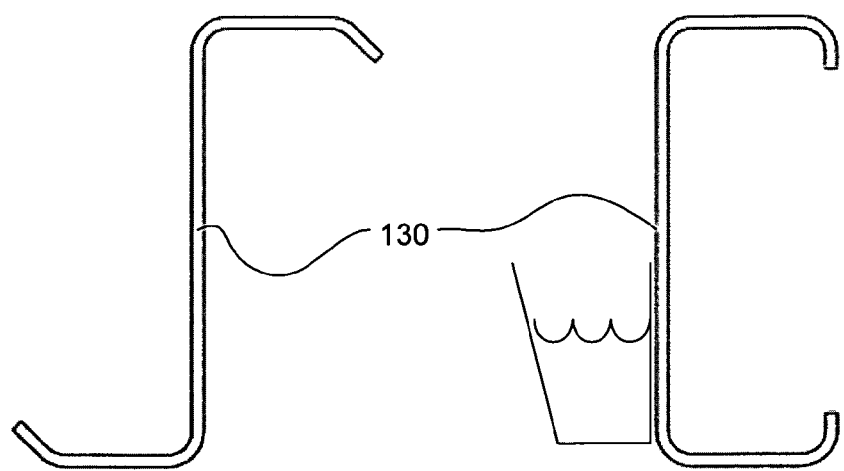
FIG. 13 illustrates an end detail view of a solar array support structure purlin, in accordance with embodiments of the invention.

FIG. 13 illustrates an end detail view of various solar array support structure purlins, in accordance with embodiments of the invention. As shown in FIG. 13, a gutter may be mounted to the support to collect water, which may be allowed to drain from the array. The gutter thus may direct rain off of the solar panels. The solar array system may also be configured to capture rainwater for agricultural uses, irrigation, animal watering, and as a supply of water for water storage for cleaning of the system.

In various embodiments of the invention, the elevated minimum heights of the array structure allow for a dual-use of the ground surface and land. The array design allows for higher than normal array heights and span distances due to the structure and design, allowing the array to rise above and span over other structures or topological features of the land. For example, the elevated minimum heights may allow for the grazing of sheep, cattle and goats, the locating of chicken coops, etc. This may provide an environmentally friendly alternative to spraying weed killing compounds on the soil or obtaining thousands of yards of rock or other weed controlling ground cover. The elevated heights may allow for dual use of existing grazing land, for example. In addition, the ground mount design may allow for parking of vehicles, tractors, storage equipment and farm equipment and may serve as a dual use of existing land that might otherwise not be available for renewable energy development. Thus, there may be an increased return of investment value from the land due to the potential for dual use of the land.

The array design may also reduce the total number of access roads on a given measure of land. Thus, the percentage of non productive square footage on a given measure of land may be reduced, along with the percentage of unproductive property costs (rent or ownership costs and property taxes) for a given value of solar energy produced.

In one embodiment, the solar panel array may be installed over a linear extending ground features, such as a road or aqueduct. If the array is designed to span the width of an aqueduct, for example, the array may provide an effective way in which to shade the aqueduct, thereby reducing evaporation that naturally occurs in the aqueduct. The array may also be mounted closely over the aqueduct in order to also disrupt or block wind which would normally freely flow over the aqueduct, thus, the solar structure also may act as a wind break to further prevent evaporation. Because of the remote location of many portions of various aqueducts, the solar structures may be installed over aqueducts without concern for interfering with other manmade structures.

Figure 14:
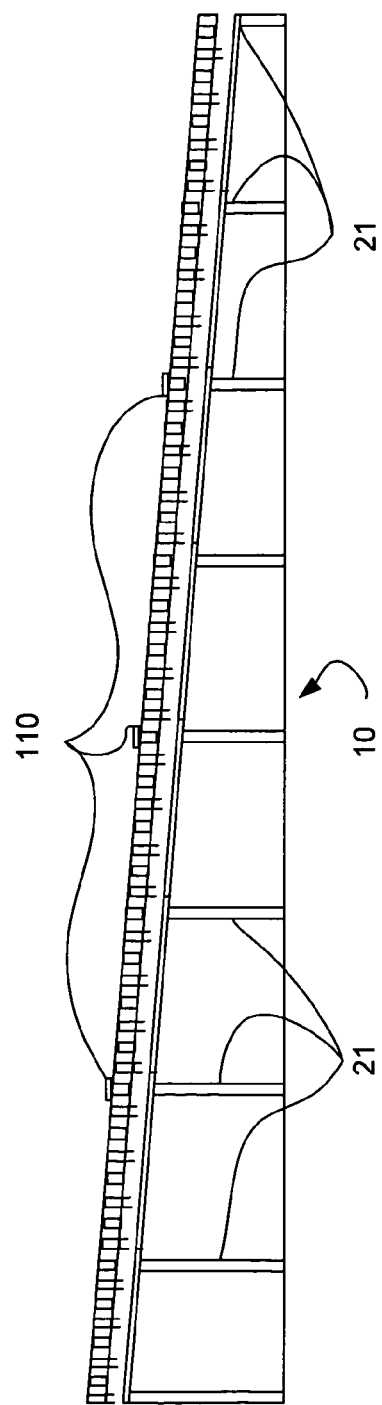
FIG. 14 illustrates a side view of a solar array support structure with varying column dimensions, in accordance with embodiments of the invention.

FIG. 14 illustrates a side view of a solar array support structure with varying column dimensions, in accordance with embodiments of the invention. As shown in FIG. 14, in order to provide maintenance for the array, a walkway may be incorporated on various portions of the array so that a person can walk to locations on the array to replace damaged solar panels or other components of the system. The walkway could be made of lightweight decking material and can also include handrails. Additional walkways can also be provided to allow direct access to other areas of the array.

Figure 15:
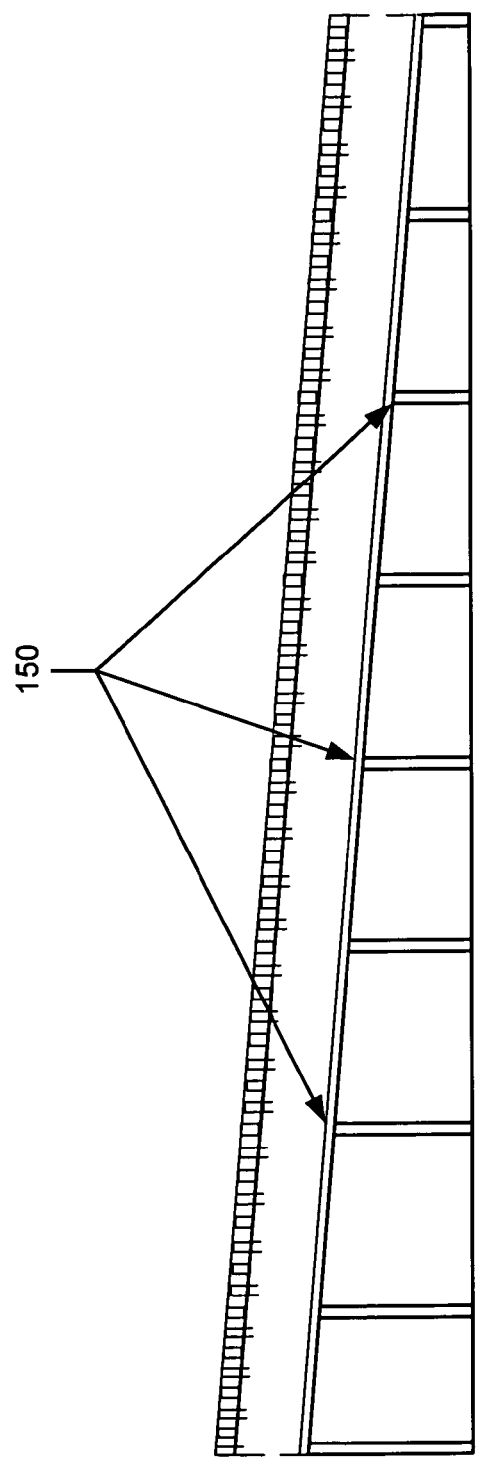
FIG. 15 illustrates a side view of solar panels mounted on a solar array support structure, with views of the lift points, in accordance with embodiments of the invention.

FIG. 15 illustrates a side view of solar panels mounted on a solar array support structure, with views of the lift points, in accordance with embodiments of the invention. Because of the design, the speed of assemble is increased and the major components of the array may be manufactured en mass and pre-assembled on site. The array design may allow cranes to place entire pallets strategically close to their final points of installation, thereby reducing manual lifting and transportation of the panels (and reducing the risk of injury to workmen). Further, the effective work height of electrical workmen is consistent underneath the array prior to the array being hoisted into final position, thus reducing the need for workmen to use ladders and reducing the risk of injury to workmen due to falls.

Figure 16:
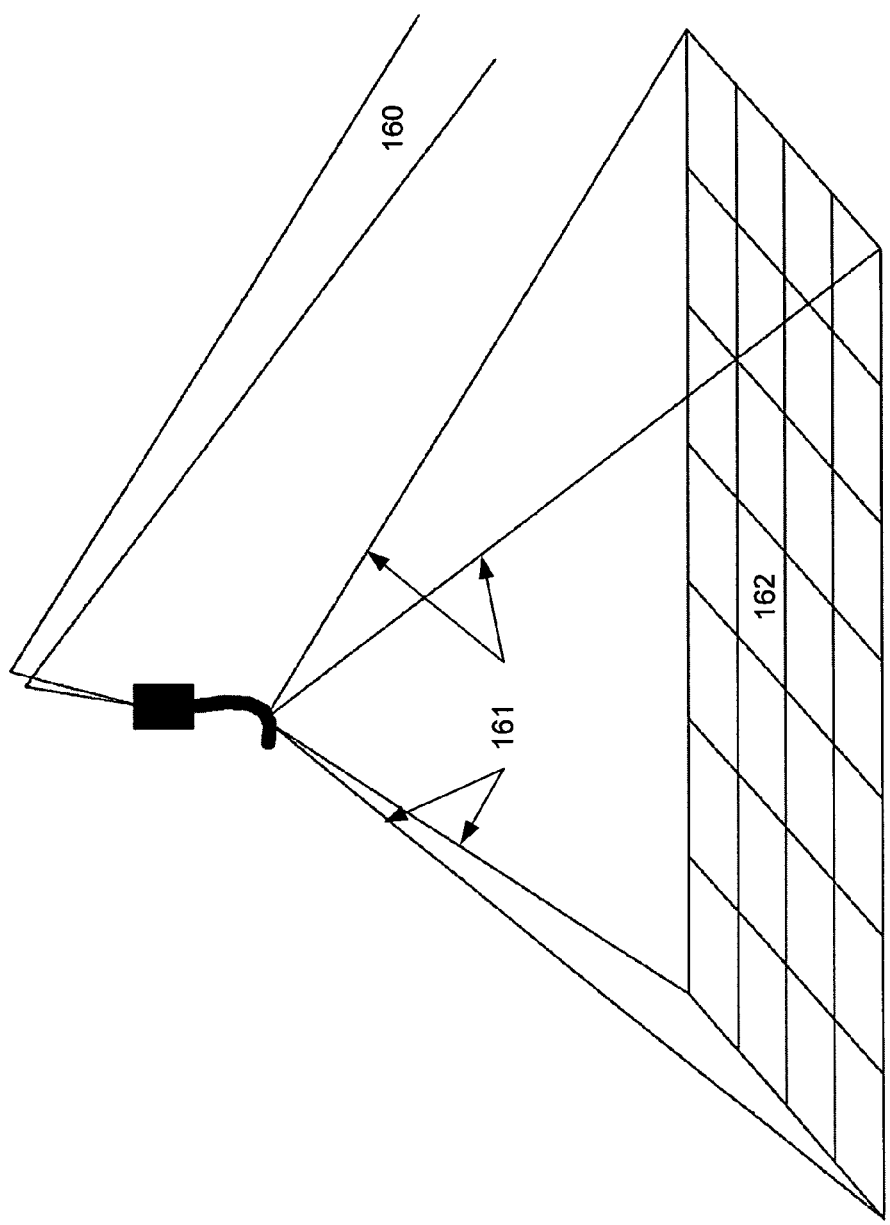
FIG. 16 illustrates an example of a crane that may be used to lift the solar array support system, in accordance with embodiments of the invention.

FIG. 16 illustrates an example of a crane that may be used to lift the solar array support system, in accordance with embodiments of the invention. Because a crane 160 can be used or other lifting techniques may be employed (such as use of a plane, helicopter, etc.), the array design allows for the strategic loading 161 of solar panels 162 in a manner that minimizes the manual lifting and transporting the panels onto the array, thus increasing productivity of workmen labor.

Figure 17:
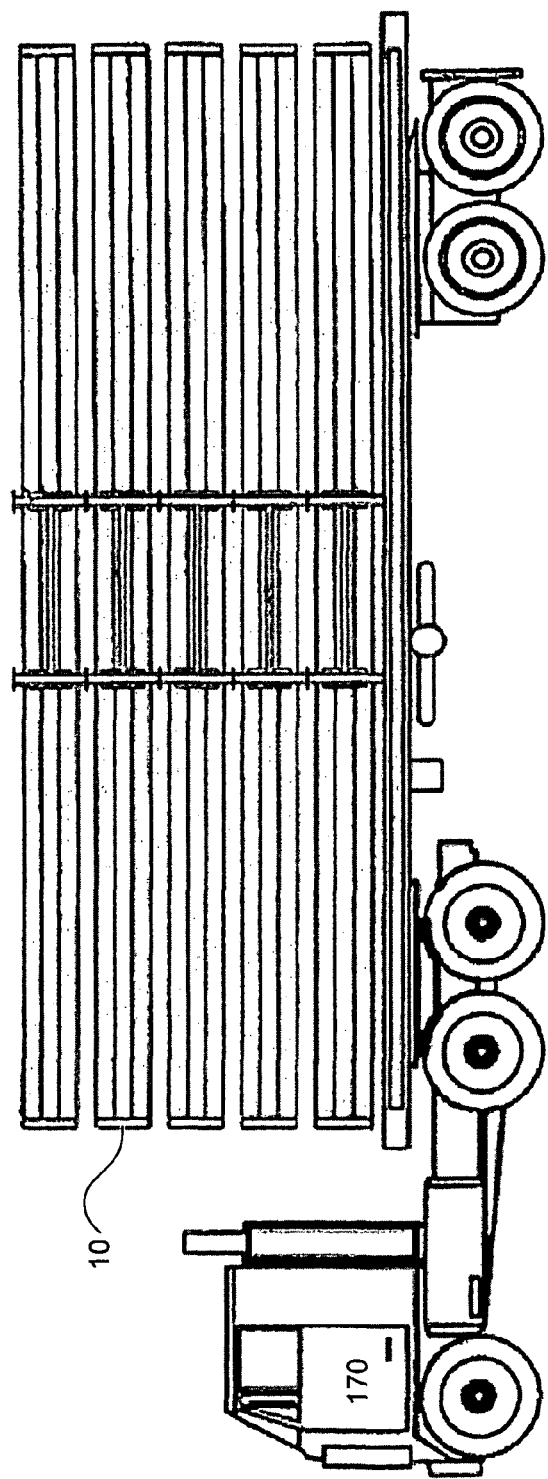
FIG. 17 illustrates how the solar array may be moved on a flat bed truck, in accordance with embodiments of the invention.

FIG. 17 illustrates how the solar array 10 may be moved on a flat bed truck 170, in accordance with embodiments of the invention. As illustrated, in the event the system is located on leased land and needs to be moved, or if the system needs to be moved for any reason (e.g., to service an underground utility feature such as water, gas or electrical), the design characteristics of the system allow for efficient dismantling and decommissioning. The system may be quickly mechanically lifted and dismantled and/or relocated, thereby reducing sinking fund costs (e.g., costs allocated for rainy day funds and end of life dismantling) and end of lifecycle removal costs and improving overall return on investment.

Figure 18:
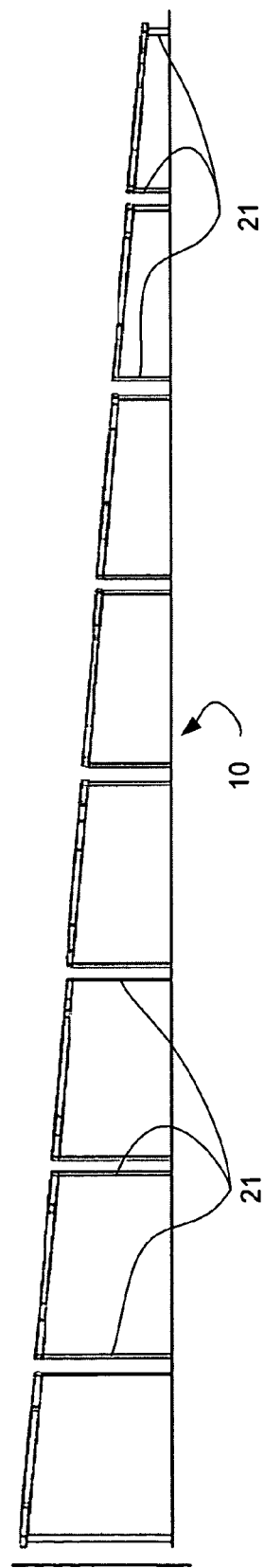
FIG. 18 illustrates a side view of the sections of a solar array support structure with varying column dimensions, in accordance with embodiments of the invention.

FIG. 18 illustrates a side view of the various columns 21 of a solar array support structure 10 with varying column dimensions, in accordance with embodiments of the invention. As shown in FIG. 18, in order to provide scalability and flexibility for application of the array, the various sections of the array can be arranged or configured to allow the greatest ease of application, assembly and disassembly.

Because the system is modular and the major components may be manufactured en mass and pre-assembled on site, the safety of workmen may be increased. The array may be configured to be cribbed (temporarily held in place) to allow workmen to perform the panel installation work from ground level versus working at varying heights. Further, because major components such as rails, struts, joists, beams, etc. may be pre-assembled in constituent parts at the manufacturing facility and shipped to site in component sections, there may be reduced delivery time of materials to the worksite. In addition, the array design allows for the reduction of installation costs for shade structures and weather structures for electrical equipment such as inverters, transformers, and switchgear as this equipment can be located underneath the arrays, thereby increasing the total return on investment and electrical efficiency of a solar system.

The system therefore results in reduced installation costs of an overall solar system. The speed with which a solar system may be erected may result in reductions in labor costs, construction period lease/ownership/property tax costs, and construction interest costs. Because of reduced installation times, there may be accelerated access to utility scale renewable energy. In addition, because of the decreased installation costs and construction interest, there may be increased return on investment thereby increasing institutional investment in the renewable energy marketplace.

All concepts of the invention may be incorporated or integrated with other solar panel array components, support and installation methods and systems, including but not limited to those described in U.S. Patent Publication No. 2010/0000516 (Conger) published on Jan. 7, 2010; U.S. Pat. No. 5,184,502 (Adams et al.) issued on Feb. 9, 1993; U.S. Pat. No. 6,559,371 (Shingleton et al.) issued on May 6, 2003; "Mounts for Solar Electric Panels" published by Northern Arizona Wind & Sun, Inc. at http://www.solar-electric.com/PV_Mounts/Solar_Panel_Mounts.htm last viewed on Jun. 8, 2010; "North Carolina Campus Goes Solar" by Emily Clark on Jan. 16, 2008 at http://www.gizmag.com/north-carolina-campus-goes-solar/8670/; and "Gable Home" by the University of Illinois Solar Decathalon at http://www.solardecathlon.uiuc.edu/gable-.html last viewed on Jun. 8, 2010, which are hereby incorporated by reference in their entirety.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While this invention has been described and illustrated with reference to particular embodiments, it will be readily apparent to those skilled in the art that the scope of the invention is not limited to the disclosed embodiments but, on the contrary, is intended to cover numerous other modifications and equivalent arrangements which are included within the spirit and scope of the following claims.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

While certain aspects of the systems and methods are presented below in certain claim forms, the inventor contemplates the various aspects of the systems and methods in any number of claim forms. Accordingly, the inventor reserves the right to add additional claims after filing the application to pursue such additional claim forms for other aspects of the systems and methods.

What is claimed is:

1. A method of assembling a photovoltaic array comprising:
   lifting a set of photovoltaic panels to a first position elevated above an underlying surface;
   performing panel installation work to the photovoltaic array from beneath the photovoltaic array while the photovoltaic array is in the first position;
   moving the set of photovoltaic panels to a second position elevated above the underlying surface;
   further assembling an underlying frame to support the set of photovoltaic panels in the elevated second position;
   setting the photovoltaic array onto the underlying surface;
   wherein the set of photovoltaic panels comprises a plurality of frame sections;
   wherein the plurality of frame sections each comprises a top surface and a bottom surface and the photovoltaic array comprises a first end and a second end; and
   wherein the to surface of each of the plurality of frame sections is inclined and substantially coplanar with the to surface of an adjacent frame section of the plurality of frame sections from the first end of the photovoltaic array to the second end of the photovoltaic array.

2. The method of claim 1, wherein the set of photovoltaic panels are lifted to the first position via a crane.

3. The method of claim 1, wherein the set of photovoltaic panels are moved to the second position via a crane.

4. The method of claim 1, wherein one or more installer performs mechanical and electrical connections of the photovoltaic panels from beneath the photovoltaic array.

5. The method of claim 1, wherein the underlying frame includes vertical supports whose lengths are variable to conform to the underlying surface while maintaining the set of photovoltaic panels at the second position.

* * * * *